(12) United States Patent
Turrini

(10) Patent No.: US 7,780,379 B2
(45) Date of Patent: Aug. 24, 2010

(54) SURFACING AND CONTOURING CUTTER FOR HIGH-SPEED MACHINING OF COMPOSITE MATERIAL PARTS

(75) Inventor: Claude Roger Robert Turrini, Ballancourt (FR)

(73) Assignee: SNECMA, Paris (FR)

( * ) Notice: Subject to any disclaimer, the term of this patent is extended or adjusted under 35 U.S.C. 154(b) by 35 days.

(21) Appl. No.: 12/355,140

(22) Filed: Jan. 16, 2009

(65) Prior Publication Data
US 2009/0185878 A1    Jul. 23, 2009

(30) Foreign Application Priority Data
Jan. 23, 2008    (FR)    ................... 08 00335

(51) Int. Cl.
*B26D 1/12*    (2006.01)
*B23C 5/10*    (2006.01)

(52) U.S. Cl. ........................... 407/30; 407/53
(58) Field of Classification Search ................... 407/42, 407/60, 53, 30, 33
See application file for complete search history.

(56) References Cited

U.S. PATENT DOCUMENTS

| | | | | |
|---|---|---|---|---|
| 1,887,373 A | * | 11/1932 | Emmons et al. | 408/144 |
| 4,284,406 A | * | 8/1981 | Hughes | 433/165 |
| 4,300,862 A | * | 11/1981 | Yada | 407/53 |
| 6,007,276 A | * | 12/1999 | Wardell | 407/54 |
| 7,223,053 B2 | * | 5/2007 | Flynn | 407/53 |
| 2004/0105729 A1 | * | 6/2004 | Giessler et al. | 407/53 |
| 2007/0231087 A1 | | 10/2007 | Reinharz et al. | |

FOREIGN PATENT DOCUMENTS

| | | |
|---|---|---|
| DE | 102 32 037 A1 | 2/2004 |
| EP | 1 348 508 A1 | 10/2003 |
| JP | 2006-110683 | 4/2006 |
| WO | WO 03/103880 A1 | 12/2003 |
| WO | WO 2005/122690 A2 | 12/2005 |

OTHER PUBLICATIONS

"Mitsubishi Materials Corp.: Turning Tools, Rotating Tools, Tooling Solutions", "General catalogue 2007-2009", Sep. 2007, Mitsubishi, XP002494573, 13 pages.

* cited by examiner

*Primary Examiner*—Will Fridie, Jr.
(74) *Attorney, Agent, or Firm*—Oblon, Spivak, McClelland, Maier & Neustadt, L.L.P.

(57) ABSTRACT

A surfacing and contouring cutter for high-speed machining of parts made of composite material, the cutter having a cut end portion with teeth (20) that are regularly spaced apart around the axis (14) of the cutter and that are separated from one another by swarf grooves, the main cutting edge of each tooth being connected to the secondary cutting edge ($S_2$) of the tooth via a corner (24) of convex rounded shape with a radius of curvature greater than about 1.5 mm, and the secondary cutting angle lying in the range about 5° to 15°.

16 Claims, 3 Drawing Sheets

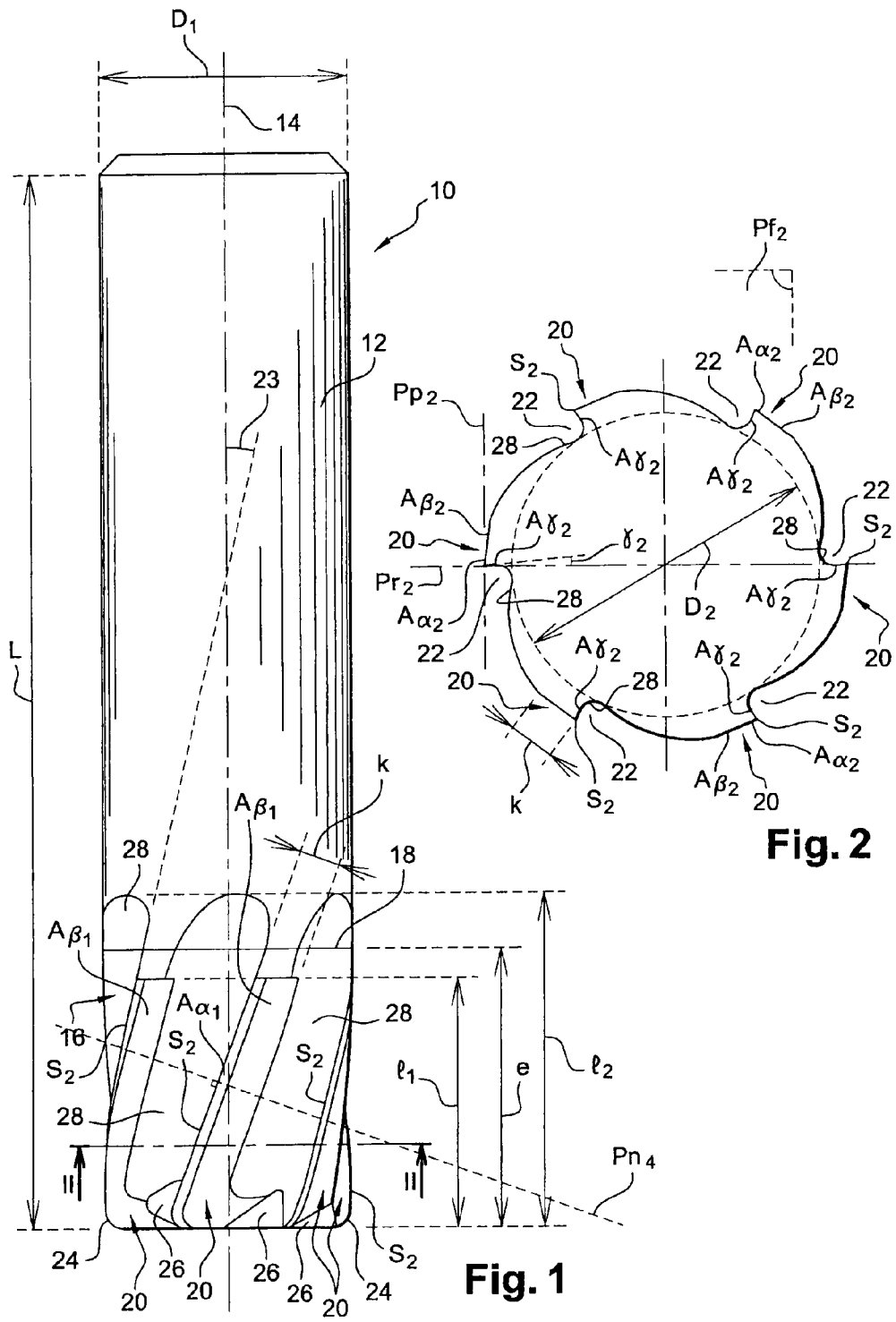

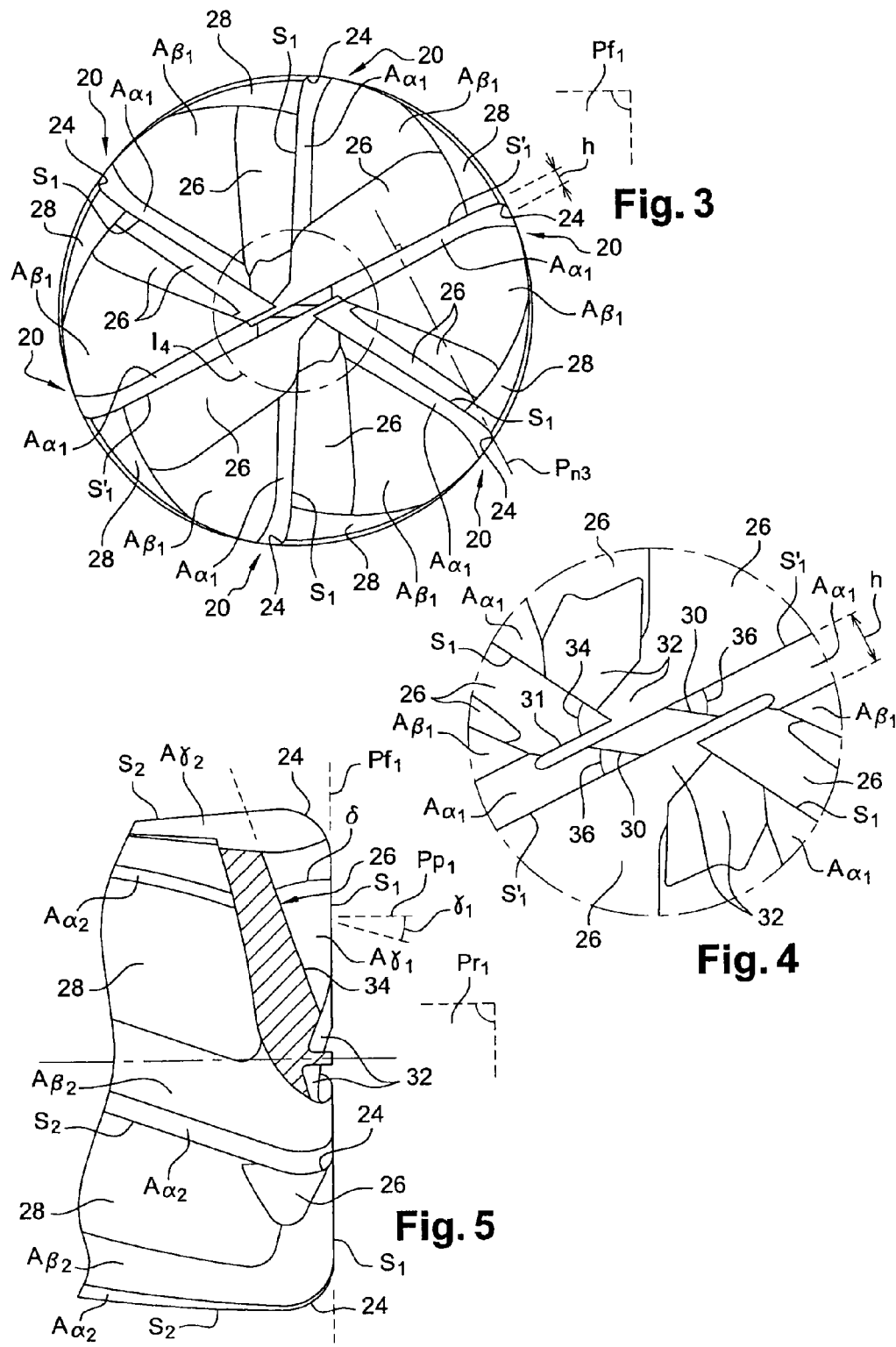

SURFACING AND CONTOURING CUTTER FOR HIGH-SPEED MACHINING OF COMPOSITE MATERIAL PARTS

The present invention relates to a surfacing and contouring cutter for high-speed machining of parts made of composite material, such as a fan casing for an airplane turbomachine, for example.

The fan casing of a turbomachine is generally cylindrical in shape with a diameter that may be of the order of about 2 meters (m). The casing may be made of a composite material based on carbon fibers embedded in a matrix of epoxy resin. The casing has annular fastener flanges at its ends that need to be machined in surfacing and/or contouring in order to eliminate any defects such as flash on the flanges.

It is essential that the tool used for machining the flanges is suitable for cutting the fibers of the composite material, as opposed to tearing them out, since that would risk damaging the composite material of the casing by delamination.

At present, for the purpose of machining the flanges of the fan casing, it is general practice to use a one-piece cutter made of carbide, with or without a diamond-based coating. Nevertheless, that type of cutter operates at peripheral cutting speeds that are relatively slow, lying in the range 20 meters per minute (m/min) to 60 m/min, thus leading to the time required for machining the casing being relatively long.

One solution to the problem would be to increase the peripheral cutting speed. Nevertheless, the material of that cutter is not adapted to operate at high cutting speeds, and high-speed machining would therefore give rise to high temperatures leading to rapid wear of the cutter. It would then be necessary to use a plurality of cutters to machine the entire outline of the flanges of the casing, which would considerably increase the risk of the flanges being damaged each time the machining operation is restarted with a new cutter.

In order to machine at high speed, proposals have already been made to make at least part of a cutter of this type out of ceramic, so as to increase the ability of the cutter to withstand high temperatures. Nevertheless, a ceramic cutter presents smaller resistance to twisting and to compression than does a carbide cutter. Furthermore, the shape of a ceramic cutter is generally suitable for only one type of machining, e.g. surfacing. When used for contouring, machining in that way generates high temperatures that are damaging to the cutter and to the part being machined and that are therefore penalizing for the machining operation. Furthermore, ceramic cutters are not always suitable for cutting parts made of composite material.

In addition, cutters of the prior art generally have a relatively small diameter in order to reduce the cutting speed gradient between the center of the cutter and its outer periphery.

The invention proposes a solution to all of the problems of the prior art, which solution is simple, effective, and inexpensive.

An object of the invention is to provide a cutter of size and shape that are particularly adapted to reducing the cutting forces and to withstand the mechanical and thermal stresses that occur while performing machining to surface and contour parts that are made of composite material.

To this end, the invention provides a surfacing and contouring cutter, in particular for high-speed machining of parts made of composite material, the cutter comprising a body having at least a portion that is made of ceramic, the body extending along the axis of rotation of the cutter and comprising a cut end portion having teeth regularly spaced around the axis of the cutter and separated from one another by swarf grooves, each tooth comprising a front main cutting edge and a side secondary cutting edge, the main cutting edge being formed by an intersection between a main cutting face and a first main flank, and the secondary cutting edge being formed by an intersection between a secondary cutting face and a first secondary flank, the main cutting edge of each tooth being connected to the secondary cutting edge of the tooth via a corner, the corner being of convex rounded shape with a radius of curvature that is greater than about 1.5 millimeters (mm), the cutter being characterized in that the secondary cutting angle between the secondary cutting face of each tooth and a first reference plane containing the axis of rotation of the cutter and a point under consideration of the secondary cutting edge of the tooth lies in the range about 5° to 15°, said cutting angle being measured in a first working plane perpendicular to the axis of rotation of the cutter and containing the point under consideration of the secondary cutting edge of the tooth, and in that the swarf grooves are formed by front flutes between the teeth, the bottom of each of these flutes being connected to a main cutting face of the tooth by a line that forms an angle lying in the range about 15° to 25° relative to a working plane perpendicular to the axis of the cutter, said angle being measured in a reference plane containing the axis of the cutter.

The body of the cutter of the invention may be constituted by a block of ceramic material or else by a portion made of carbide and having a ceramic tip secured to the end thereof, e.g. by brazing. Under such circumstances, the cut portion of the cutter extends over the entire thickness of the tip and may also extend over a portion of the length of the carbide body. By way of example, the cutter has six teeth that are regularly distributed around the axis of the cutter and that are spaced apart from one another by swarf grooves.

According to the invention, the connection corner between the main cutting edge and the secondary cutting edge of each tooth has a radius of curvature that is relatively large, greater than 1.5 mm, e.g. greater than about 2 mm. Furthermore, the main cutting angle of each tooth is positive and lies in the range about 5° to 15°.

The secondary cutting angle of each tooth may be positive and may lie in the range about 5° to 15°. By way of example the main and secondary cutting angles are 10°.

Because of the combination of shape and size characteristics of the cutter of the invention, the cutting forces that pass between the teeth and the part being machined are relatively low, so the cutter withstands without damage the thermal and mechanical stresses generated (in twisting and compression) during a machining operation. The cutter is particularly suitable for high-speed machining of a fan casing of the type specified above, thus enabling the time required to machine the casing to be reduced by a factor of ten compared with using a carbide cutter as in the prior art.

The cutter of the invention serves to machine parts made of composite material, e.g. based on carbon fibers embedded in an epoxy resin matrix. The cutter can be used for machining this type of material at relatively high cutting speeds, with depths of cut that are determined to avoid delaminating the composite material while it is being machined. There is no need to use a lubricant with the cutter of the invention.

In addition, in the invention, the swarf grooves are formed by front flutes between the teeth, with the bottom of each of the flutes being connected to a main cutting face of a tooth by a line that forms an angle lying in the range about 15° to 25° relative to a working plane perpendicular to the axis of the cutter, this angle being measured in a reference plane containing the axis of the cutter. The swarf grooves of the cutter are then present volume that is relatively small, while nevertheless being sufficient for momentaneous storage and removal of swarf, since the swarf is essentially in the form of powder or fine particles.

In a particular embodiment of the invention, the cutter has an outside diameter greater than 15 mm, e.g. of about 18 mm, and its core has a diameter greater than 10 mm, e.g. of about 15 mm.

According to another characteristic of the invention, the main cutting edge of each tooth is rectilinear and extends substantially parallel to a working plane perpendicular to the axis of the cutter.

The main cutting edge of each tooth thus presents an orientation that is substantially horizontal, thereby conferring on said tooth a function of scraping or flattening the corresponding surface of the part that is being machined, and enabling the surface state of said part to be of better quality after machining.

Preferably, the secondary cutting edge of each tooth extends helically around the axis of the cutter and defines a helix angle lying in the range 1° to 40°, and for example equal to about 20°.

Advantageously, the cutter has two diametrically-opposite teeth with long main cutting edges that are connected to each other at their radially inner ends via at least one central edge.

The other teeth of the cutter may have short main cutting edges with their radially inner ends spaced apart from the central edge by recesses formed close to said central edge.

According to yet other advantageous characteristics of the cutter of the invention:
  a second main flank extends rearwards from the first main flank, and a second secondary flank extends behind the first secondary flank;
  the first main flank of each tooth has a thickness h lying in the range about 0.5 mm to 1 mm;
  the cumulative thickness k of the first and second secondary flanks of each tooth is greater than about 2 mm; and
  the cut portion of the cutter is substantially cylindrical in shape.

The invention also provides a method of machining a part at high speed, in particular a composite material part, by means of a cutter as described above, the method being characterized in that the peripheral cutting speed of the cutter lies in the range 500 m/min to 1000 m/min, and the advance per revolution lies in the range 0.03 mm to 0.12 mm. The depth of cut of the cutter may lie in the range about 0.2 mm to 1.5 mm.

These value ranges determine optimum conditions in which it is recommended to use the cutter of the invention without risk of accelerated wear or breakage of the cutter. Nevertheless, it is possible to use the cutter outside these ranges.

The invention can be better understood and other details, characteristics, and advantages of the present invention appear more clearly on reading the following description given by way of non-limiting example and with reference to the accompanying drawings, in which:

FIG. 1 is a diagrammatic side view of a surfacing and contouring cutter of the invention;

FIG. 2 is a diagrammatic section view on line II-II of FIG. 1, and on a larger scale;

FIG. 3 is a diagrammatic bottom view of the FIG. 1 cutter on a larger scale;

FIG. 4 is a view on a larger scale showing detail $I_4$ of FIG. 3;

FIG. 5 is an enlarged view of the active portion of the FIG. 1 cutter;

FIGS. 1 to 5 show an embodiment of a cutter 10 of the invention for machining parts made of composite material in surfacing and in contouring, and in particular for machining airplane turbomachine parts.

Figure 6:
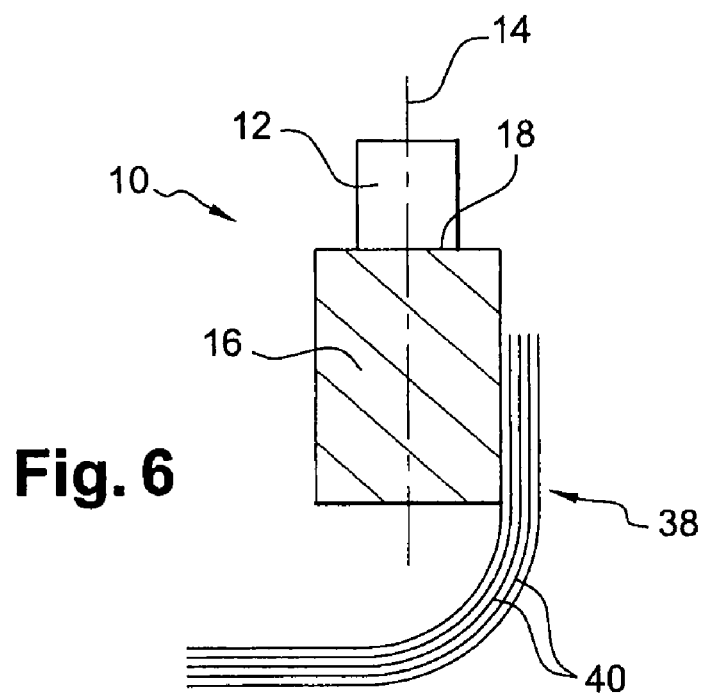
FIG. 6 is a highly diagrammatic view representing a machining operation of contouring a part.

The cutter 10 comprises a carbide body 12 of elongate shape extending along the axis of rotation 14 of the cutter and having a ceramic tip 16 secured to one end thereof by brazing, the tip 16 comprising the active portion of the cutter. The other end of the body 12 of the cutter is for fastening by appropriate means to the chuck of a machine tool.

The body 12 of the cutter may be made of tungsten carbide and its tip 16 may be made of a ceramic based on alumina reinforced by silicon carbide fibers, based on zirconia, on silicon nitride, etc., or on combinations of these materials.

The brazed joint 18 between the body 12 and the tip 16 lies in a plane perpendicular to the axis of rotation 14 of the cutter.

The end portion of the cutter situated in the region of the ceramic tip 16 is cut to define cutting teeth 20.

The cut portion extends over a length $l_2$ along the axis 12 of the cutter that is generally greater than the axial dimension or thickness e of the ceramic tip 16.

The length $l_1$ of the active or working portion of the cutter, i.e. the portion of the cutter that is to be used for machining a part during a cutting operation, is no greater than the thickness e of the tip 16, i.e. only the ceramic tip is intended to make contact with the material that is to be machined. The ceramic tip 16 presents great hardness, great ability to withstand high temperatures, and is suitable for machining at high speed.

In the particular example shown, the cutter 10 is generally cylindrical in shape having an outside diameter $D_1$ greater than 15 mm, e.g. of 18 mm, and a total length L of the order of about 80 mm. The cut portion presents a length $l_2$ of about 24 mm, with the thickness e of the tip 16 being of the order of about 20 mm, and the working portion of the cutter has a length $l_1$ of about 18 mm. The core of the cutter has a diameter $D_2$ of the order of about 15 mm.

The cutter 10 has six teeth 20 that are regularly distributed around the axis 14 of the cutter and that are separated from one another by swarf grooves 22.

Each tooth 20 has a main cutting edge $S_1$, $S_1'$ that is substantially radial (FIG. 3) and a secondary cutting edge $S_2$ that extends substantially helically about the axis 14 of the cutter (FIG. 1). The helix angle 23 lies in the range 1° to 40°, preferably in the range 10° to 30°, and for example is about 20°.

The main cutting edge $S_1$, $S_1'$ of each tooth is connected to the secondary cutting edge $S_2$ of the tooth via a corner 24 of outwardly convex rounded shape with a radius of curvature greater than about 1.5 mm, for example equal to 2 mm (FIG. 5).

The main cutting edge $S_1$, $S_1'$ of each tooth is formed by an intersection between a main cutting face $A_{\gamma 1}$ (FIG. 5) and a first main flank $A_{\alpha 1}$ (FIG. 3). The first main flank $A_{\alpha 1}$ extends towards the rear of the tooth via a second main flank $A_{\beta 1}$.

The secondary cutting edge $S_2$ of each tooth is formed by an intersection between a secondary cutting face $A_{\gamma 2}$ (FIG. 2) and a first secondary flank $A_{\alpha 2}$ (FIGS. 2 and 5). The first secondary flank $A_{\alpha 2}$ may be extended rearwards by a second secondary flank $A_{\beta 2}$ (FIG. 5).

The main cutting face $A_{\gamma 1}$ of each tooth is connected at its radially outer end to the secondary cutting face $A_{\gamma 2}$ of the tooth (FIG. 5). These cutting faces $A_{\gamma 1}$, $A_{\gamma 2}$ are formed respectively by front and side flutes 26 and 28 that define the swarf grooves 22 (FIGS. 1, 3, and 5).

Two diametrically-opposite main cutting edges $S_1'$, referred to as "long" edges, are interconnected at their radially inner ends situated on the axis 14 by at least one central edge 30 (FIG. 4). These main cutting edges $S_1'$ are carried by teeth 20 that are referred to as "long" teeth.

The other four teeth 20 are referred to as "short" teeth and the radially inner ends of their main cutting edges $S_1$ are each connected to a central edge 31, these central edges 31 being spaced apart from one another. This is achieved by means of recesses 32 situated close to the axis 14 of the cutter on either side of the long main cutting edges $S_1'$ (FIGS. 4 and 5).

In the drawings, the following planes are defined:

$P_r$: a reference plane of the cutter including a point of the main cutting edge $S_1$, $S_1'$ or of the secondary cutting edge $S_2$ of a tooth 20, and including the axis of rotation 14 of the cutter;

$P_f$: a working plane of the cutter containing a point under consideration of the main cutting edge $S_1$, $S_1'$ or of the secondary cutting edge $S_2$ of a tooth 20 and perpendicular to the axis 14 of the cutter and to the reference plane containing the point under consideration of the edge;

$P_p$: a plane towards the rear of the cutter containing a point under consideration of the main cutting edge $S_1$, $S_1'$ or of the secondary cutting edge $S_2$ of a tooth 20 and perpendicular to the reference plane and to the working plane passing through the point under consideration of the edge;

$P_n$: a plane normal to the edge, perpendicular to the main cutting edge $S_1$, $S_1'$ or the secondary cutting edge $S_2$ of a tooth at the point under consideration of said edge; and $P_s$: an edge plane of the cutter, tangential to the main cutting edge $S_1$, $S_1'$ or to the secondary cutting edge $S_2$ of a tooth at a point under consideration of said edge and perpendicular to the reference plane $P_r$ passing through the point under consideration of said edge.

These planes serve to define and measure various angles and dimensions of the cutter of the invention.

The secondary cutting angle $A_{\gamma 2}$ between the secondary cutting face $A_{\gamma 2}$ of each tooth and the first reference plane $P_{r1}$ containing a point of the secondary cutting edge $S_2$ of the tooth, lies in the range 5° to 15°, preferably in the range 8° to 12°, and is equal to about 10°, for example. This angle $\gamma_2$ is measured in the working plane $P_{f1}$ containing the point under consideration of the edge $S_2$. The working plane $P_{f1}$ shown in FIG. 2 corresponds to the section plane II-II of FIG. 1.

The main cutting angle $\gamma_1$ between the main cutting face $A_{\gamma 1}$ of each tooth and a reference plane $P_{r1}$ containing a point of the main cutting edge $S_1$, $S_1'$ of the tooth, lies in the range 5° to 15°, preferably in the range 8° to 12°, and is equal to about 10°, for example. This angle $\gamma_1$ is measured in a plane $P_{p1}$ towards the rear containing the point under consideration of the edge (FIG. 5).

The main cutting edges $S_1$, $S_1'$ of the teeth extend substantially parallel to a working plane containing said edges. In FIG. 5, the edges $S_1$, $S_1'$ extend in the plane $P_{f1}$.

The first main flank $A_{\alpha 1}$ of each tooth has a transverse dimension or thickness h lying in the range 0.5 mm to 1 mm approximately (FIGS. 3 and 4). This thickness h is equal to the length of the line of intersection between the first main flank $A_{\alpha 1}$ and a plane $P_{n3}$ normal to the edge containing a point of the corresponding main cutting edge $S_1$, $S_1'$, and measured in a plane tangential to the first main flank $A_{\alpha 1}$ and containing on the point under consideration of the edge (FIG. 3). This thickness h may vary radially from the inside to the outside over the range about 0.5 mm to 0.7 mm, in particular because of the above-mentioned recesses 32 (FIGS. 3 and 4).

The first and second secondary flanks $A_{\alpha 2}$ and $A_{\beta 2}$ of each tooth present a transverse dimension or cumulative thickness k that lies in the range 1 mm to 4 mm, preferably in the range 2 mm to 3 mm approximately. This thickness k is equal to the sum of the lengths of the lines of intersection between the first and second secondary flanks $A_{\alpha 2}$, $A_{\beta 2}$ and a plane $P_{n4}$ normal to the edge (FIGS. 1 and 2) containing a point under consideration of the corresponding secondary cutting edge $S_2$ of the tooth. These lengths are measured in respective planes that are tangential to the first and second flanks $A_{\alpha 2}$, $A_{\gamma 2}$.

The line of intersection 34 between the bottom of the front flute 26 and the corresponding main cutting face $A_{\gamma 1}$ of each tooth forms an angle δ lying in the range 15° to 25°, preferably in the range 18° to 22°, and for example equal to about 200, relative to a working plane $P_{f1}$ containing a point of the main cutting edge $S_1$, $S_1'$ of the tooth. This angle δ is measured in a reference plane $P_{r1}$ containing the point under consideration of the edge $S_1$, $S_1'$ (FIG. 5).

The relief angle $\alpha_1$ (not shown) between the first main flank $A_{\alpha 1}$ of each tooth and an edge plane $P_{s3}$ (not shown) containing a point under consideration of the main cutting edge $S_1$, $S_1'$ of the tooth is positive and lies in the range 2° to 8°, and preferably in the range 4° to 6°. This angle is measured in a radial plane $P_{n3}$ at the point under consideration of the edge (FIG. 3).

The relief angle $\alpha_2$ (not shown) between the first secondary flank $A_{\alpha 2}$ of each tooth and the edge plane $P_{s4}$ (not shown) containing a point under consideration of the secondary cutting edge $S_2$ of the tooth is positive and lies in the range 2° to 8°, and preferably in the range 4° to 6°. This angle $\alpha_2$ is measured in a plane $P_{n4}$ normal to the point under consideration of the edge (FIG. 1).

The relief angles $\beta_1$, $\beta_2$ (not shown) between the second primary and secondary flanks $A_{\beta 1}$, $A_{\beta 2}$ and the above-mentioned edge faces $P_{s3}$, $P_{s4}$ are positive. These angles are measured in the planes $P_{n3}$, $P_{n4}$ normal to the points under consideration of the edges.

The angle 34 between the main cutting edge $S_1$ of each short tooth and the corresponding main edge 31 is for example of the order of about 60°. The angle 36 between the main cutting edge $S_1'$ of each long tooth and the corresponding central edge 30 is for example of the order of about 65°. These two angles may be measured in a working plane $P_{f1}$ containing the point of intersection between the edges $S_1$ and 31 and the edges $S_1'$ and 30, respectively (FIGS. 1 and 2).

The cutter 10 shown in the drawings is suitable for high-speed machining of parts made of composite material, in surfacing and in contouring. FIG. 6 shows a step of machining by contouring during which the cutter comes into contact with the part 32 for machining via the secondary cutting edges $S_2$ of its teeth, i.e. via the side portion of the cutter. The part 38 for machining (shown in part only in this drawing) is an annular flange for fastening a fan casing of a turbomachine. By way of example, the casing is made of an epoxy resin matrix having sheets 40 of carbon fibers embedded therein.

Figure 7:
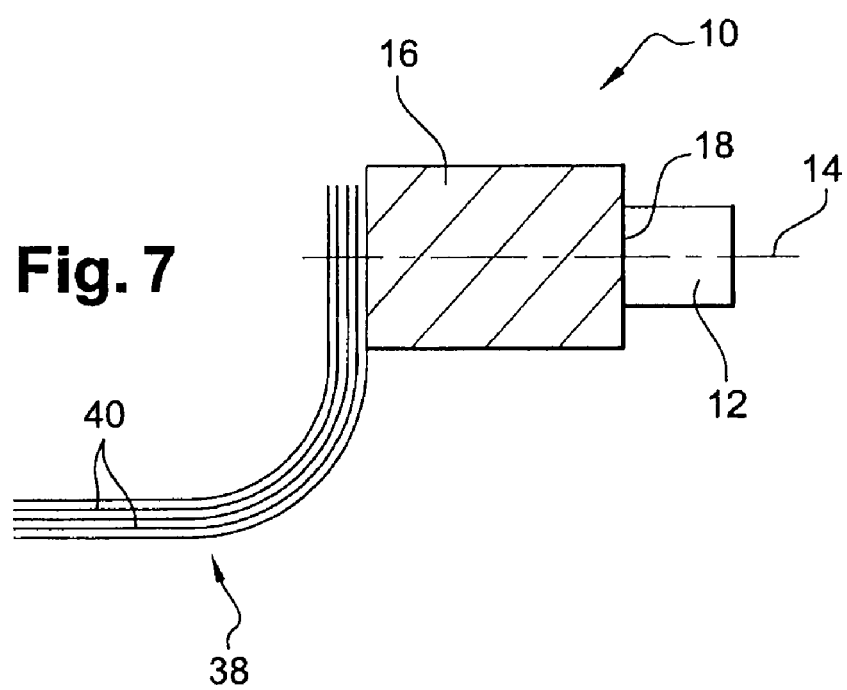
FIG. 7 is a highly diagrammatic view representing a machining operation of surfacing a part.

FIG. 7 shows a step of surfacing the flange in which the cutter comes into contact via its front portion, i.e. via the main cutting edges $S_1$, $S_1'$ of its teeth, against a surface of the flange that is to be machined.

The dimensional and geometrical characteristics of the cutter of the invention are particularly suitable for avoiding delamination of the part while it is being machined.

In the particular example shown in FIGS. 1 to 5, the optimum peripheral cutting speed of the cutter lies in the range 500 m/min to 1000 m/min, with the advance per revolution lying in the range 0.03 mm to 0.12 mm (advance per tooth of 0.005 mm to 0.02 mm) and with the depth of cut lying in the range 0.2 mm to 1.5 mm, approximately.

The specific energy of cutting during the machining of a part made of composite material is of the order of 20 watts per cubic centimeter per minute (W/cm$^3$/min) to 40 W/cm$^3$/min. During machining, the temperature generated in the part and in the cutter generally does not exceed 200° C.

The invention claimed is:

1. A surfacing and contouring cutter, in particular for high-speed machining of parts made of composite material, the cutter comprising a body having at least a portion that is made of ceramic, the body extending along the axis of rotation of the cutter and comprising a cut end portion having teeth regularly spaced around the axis of the cutter and separated from one another by swarf grooves, each tooth comprising a front main cutting edge and a side secondary cutting edge, the main cutting edge being formed by an intersection between a main cutting face and a first main flank, and the secondary cutting edge being formed by an intersection between a secondary cutting face and a first secondary flank, the main cutting edge of each tooth being connected to the secondary cutting edge of the tooth via a corner, the corner being of convex rounded shape with a radius of curvature that is greater than about 1.5 mm, the cutter being characterized in that the secondary cutting angle between the secondary cutting face of each tooth and a first reference plane containing the axis of rotation of the cutter and a point under consideration of the secondary cutting edge of the tooth lies in the range about 5° to 15°, said cutting angle being measured in a first working plane perpendicular to the axis of rotation of the cutter and containing the point under consideration of the secondary cutting edge of the tooth, and in that the swarf grooves are formed by front flutes between the teeth, the bottom of each of these flutes being connected to a main cutting face of the tooth by a line that forms an angle lying in the range about 15° to 25° relative to a working plane perpendicular to the axis of the cutter, said angle being measured in a reference plane containing the axis of the cutter.

2. A cutter according to claim 1, characterized in that the main cutting angle between the main cutting face of each tooth and a second reference plane containing the axis of rotation of the cutter and a point under consideration of the main cutting edge of the tooth lies in the range about 5° to 15°, said cutting angle being measured in a plane towards the rear perpendicular to the second reference plane and to a second working plane perpendicular to the axis of rotation of the cutter and containing the point under consideration of the main cutting edge of the tooth.

3. A cutter according to claim 1, characterized in that the main cutting angle is about 10°, and/or the secondary cutting angle is about 10°.

4. A cutter according to claim 1, characterized in that the radius of curvature of the corner is greater than or equal to about 2 mm.

5. A cutter according to claim 1, characterized in that it has six teeth.

6. A cutter according to claim 1, characterized in that it has an outside diameter greater than 15 mm, e.g. of about 18 mm.

7. A cutter according to claim 1, characterized in that the core of the cutter has a diameter greater than 10 mm, e.g. of about 15 mm.

8. A cutter according to claim 1, characterized in that the main cutting edge of each tooth is rectilinear and extends substantially parallel to a working plane perpendicular to the axis of the cutter.

9. A cutter according to claim 1, characterized in that the secondary cutting edge of each tooth extends helically around the axis of the cutter and defines a helix angle lying in the range 1° to 40°, and for example equal to about 20°.

10. A cutter according to claim 1, characterized in that a second main flank extends rearwards from the first main flank, and a second secondary flank extends behind the first secondary flank.

11. A cutter according to claim 1, characterized in that the first main flank of each tooth has a thickness h lying in the range about 0.5 mm to 1 mm.

12. A cutter according to claim 1, characterized in that the cumulative thickness k of the first and second secondary flanks of each tooth is greater than about 2 mm.

13. A cutter according to claim 1, characterized in that two diametrically-opposite teeth have long main cutting edges that are connected to each other at their radially inner ends via at least one central edge.

14. A cutter according to claim 13, characterized in that the other teeth of the cutter have short main cutting edges with radially inner ends that are spaced apart from the central edge by recesses formed close to said central edge.

15. A cutter according to claim 1, characterized in that the cut portion of the cutter is substantially cylindrical in shape.

16. A method of machining a part at high speed, in particular a part made of composite material, by means of a cutter according to claim 1, the method being characterized in that the peripheral cutting speed of the cutter lies in the range 500 m/min to 1000 m/min, and the advance per revolution lies in the range 0.03 mm to 0.12 mm.

* * * * *

UNITED STATES PATENT AND TRADEMARK OFFICE
CERTIFICATE OF CORRECTION

PATENT NO. : 7,780,379 B2  Page 1 of 1
APPLICATION NO. : 12/355140
DATED : August 24, 2010
INVENTOR(S) : Claude Roger Robert Turrini It is certified that error appears in the above-identified patent and that said Letters Patent is hereby corrected as shown below:

Column 5, line 39, change "$A_{\gamma 2}$" to --$\gamma_2$--.

Column 6, line 14, change "200" to --20°--.

Signed and Sealed this

Twenty-third Day of November, 2010

David J. Kappos
*Director of the United States Patent and Trademark Office*